(12) United States Patent
Veine et al.

(10) Patent No.: US 6,983,989 B1
(45) Date of Patent: Jan. 10, 2006

(54) LINEAR ADJUSTABLE ACTIVE HEAD RESTRAINT

(75) Inventors: Eric Veine, Madison Heights, MI (US); Nagarjun Yetukuri, Rochester Hills, MI (US); Gerald S. Locke, Lake Orion, MI (US); Dale Smallwood, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 32 days.

(21) Appl. No.: 10/711,555

(22) Filed: Sep. 24, 2004

(51) Int. Cl.
*B60N 2/427* (2006.01)
*B60N 2/48* (2006.01)
*B60R 21/00* (2006.01)

(52) U.S. Cl. ............................................. 297/216.12
(58) Field of Classification Search ............ 297/216.12
See application file for complete search history.

(56) References Cited

U.S. PATENT DOCUMENTS

| | | | | |
|---|---|---|---|---|
| 4,278,291 A | * | 7/1981 | Asai .................. | 297/216.12 X |
| 4,576,413 A | | 3/1986 | Hatta | |
| 4,840,428 A | | 6/1989 | Kobayashi et al. | |
| 4,844,544 A | | 7/1989 | Ochiai | |
| 5,378,043 A | * | 1/1995 | Viano et al. ........ | 297/216.12 X |
| 5,795,019 A | * | 8/1998 | Wieclawski ............ | 297/216.12 |
| 5,882,071 A | * | 3/1999 | Fohl ...................... | 297/216.12 |
| 5,884,968 A | * | 3/1999 | Massara ................. | 297/216.12 |
| 6,000,760 A | | 12/1999 | Chung | |
| 6,017,086 A | * | 1/2000 | Meyer et al. .......... | 297/216.12 |
| 6,019,424 A | * | 2/2000 | Ruckert et al. ........ | 297/216.12 |
| 6,024,405 A | | 2/2000 | MacAndrew et al. | |
| 6,079,776 A | | 6/2000 | Breitner et al. | |
| 6,199,947 B1 | * | 3/2001 | Wiklund ................ | 297/216.12 |
| 6,375,262 B1 | * | 4/2002 | Watanabe .......... | 297/216.12 X |
| 6,416,125 B1 | * | 7/2002 | Shah et al. ............ | 297/216.12 |
| 6,419,322 B2 | | 7/2002 | Nakane et al. | |
| 6,550,865 B2 | * | 4/2003 | Cho ....................... | 297/216.12 |
| 6,565,150 B2 | * | 5/2003 | Fischer et al. ......... | 297/216.12 |
| 6,568,753 B1 | * | 5/2003 | Watanabe .............. | 297/216.12 |
| 6,604,788 B1 | * | 8/2003 | Humer .............. | 297/216.12 X |
| 6,616,236 B1 | | 9/2003 | Su | |
| 6,623,073 B2 | * | 9/2003 | Schafer et al. ......... | 297/216.12 |
| 6,631,949 B2 | * | 10/2003 | Humer et al. ........... | 297/216.12 |
| 6,631,955 B2 | * | 10/2003 | Humer et al. ....... | 297/216.12 X |
| 6,655,733 B2 | * | 12/2003 | Humer et al. .......... | 297/216.12 |
| 6,688,697 B2 | * | 2/2004 | Baumann et al. ... | 297/216.12 X |
| 6,692,071 B2 | | 2/2004 | Fowler | |
| 6,719,368 B1 | * | 4/2004 | Neale ................ | 297/216.12 X |

(Continued)

*Primary Examiner*—Rodney B. White
(74) *Attorney, Agent, or Firm*—Earl LaFontaine

(57) ABSTRACT

An automotive seat assembly is provided including a seatbase defining a seatbase plane and a seatback defining a seatback plane. A head restraint support member is configured to extend vertically from the seatback. The head restraint support member has a vertical extension portion extending generally parallel to the seatback plane, at least one horizontal travel arm generally perpendicular to the seatback plane, and a horizontal base arm. A head restraint inner structure engages the at least one horizontal travel arm and is movable linearly to a plurality of positions along the at least one horizontal travel arm. An active head restraint element is mounted to the head restraint inner structure and the horizontal base arm and is movable between a stowed position and a deployed position. The active head restraint element moves the head restraint inner structure to a head restraint forward position in response to moving into the deployed position. The active head restraint restraint element is biased towards the deployed position. A trigger element retains the active head restraint element in the stowed position and releases the active head restraint element during vehicle impact.

20 Claims, 4 Drawing Sheets

U.S. PATENT DOCUMENTS

| | | |
|---|---|---|
| 6,726,283 B2 | 4/2004 | Schambre et al. |
| 6,749,256 B1 * | 6/2004 | Klier et al. ............ 297/216.12 |
| 6,779,840 B1 * | 8/2004 | Farquhar et al. ....... 297/216.12 |
| 6,783,177 B1 * | 8/2004 | Nakano ................. 297/216.12 |
| 6,789,845 B2 * | 9/2004 | Farquhar et al. ....... 297/216.12 |
| 6,789,846 B2 * | 9/2004 | Humer et al. .......... 297/216.12 |
| 6,830,278 B2 * | 12/2004 | Yoshizawa et al. . 297/216.12 X |
| 2003/0001414 A1 * | 1/2003 | Humer et al. .......... 297/216.12 |
| 2003/0011224 A1 * | 1/2003 | Humer et al. .......... 297/216.12 |
| 2003/0015897 A1 * | 1/2003 | Humer et al. .......... 297/216.12 |
| 2003/0057748 A1 * | 3/2003 | Schafer et al. ......... 297/216.12 |
| 2003/0151279 A1 | 8/2003 | Fowler |
| 2003/0160481 A1 * | 8/2003 | Veine et al. ........... 297/216.12 |
| 2003/0227199 A1 * | 12/2003 | Yoshizawa et al. .... 297/216.12 |
| 2004/0070240 A1 * | 4/2004 | Hang ................... 297/216.12 |
| 2004/0075312 A1 * | 4/2004 | Neale ................... 297/216.12 |
| 2004/0108766 A1 | 6/2004 | Baker et al. |
| 2004/0119324 A1 * | 6/2004 | Humer et al. .......... 297/216.12 |
| 2004/0145223 A1 * | 7/2004 | Lee ....................... 297/216.12 |
| 2004/0155496 A1 * | 8/2004 | Farquhar et al. ....... 297/216.12 |
| 2004/0195872 A1 * | 10/2004 | Svantesson ........ 297/216.12 X |

* cited by examiner

LINEAR ADJUSTABLE ACTIVE HEAD RESTRAINT

TECHNICAL FIELD

The present invention relates generally to an automotive seat assembly and more particularly to an automotive seat assembly with a linear adjustable head restraint.

BACKGROUND OF THE INVENTION

Automotive design is guided by a never-ending goal of improving the safety and comfort of passengers traveling within the vehicles. As the nature of existing vehicular travel precludes the ability to completely eliminate incidents of collision during operation, automotive designers pursue design improvements to minimize the impact of such collisions on the internal passengers. These design improvements often are located in a wide variety of components within the automobile. They may include a variety of features and functions from intrusion reduction to momentum absorbance.

One such category involves the use of energy seat impact response devices. These devices are utilized to protect passengers during collision. One example are safety mechanisms designed to move the head restraint forward in order to engage the passenger's head during rear-impact scenarios. By actively engaging the passenger's head, momentum from the passenger's head can be reduced and thereby further insure the comfort and safety of the passenger during collision. These safety mechanisms are commonly operated by rotating the head restraint assembly forward to engage the passenger. The nature of most head restraint shapes dictate that as they rotate the profile of their engagement surface with change. Additional designs considerations, therefore, must be imposed on the overall head restraint shape and design.

An improve approach would be to allow the head restraint assembly to be adjusted t coincide with an individual occupant's personal comfort and preferences. When the safety mechanism is deployed, it would be preferable that the head restraint be brought forward while retaining the configuration set for such personal comfort and preference. In this scenario the head restraint assembly would be properly configured to engage an occupants head even during forward-engaging motion. This could be accomplished by isolating the fore/aft motion necessary for engagement during impact from the adjustment features necessary for comfort. If combined with adjustment features that allowed the static distance from an occupant's head to the head restraint to be minimized, the pure linear forward engaging motion could be utilized to reduce engagement time during impact. This, in turn, could result in a further reduction in occupant realized stress which would be highly desirable.

SUMMARY OF THE INVENTION

It is, therefore, an object of the present invention to provide an automotive seat assembly with an adjustable head restraint assembly. It is a further object of the present invention to provide such a head restraint assembly that includes an active forward engagement feature providing pure linear forward engagement action.

An automotive seat assembly is provided including a seatbase defining a seatbase plane and a seatback defining a seatback plane. A head restraint support member is configured to extend vertically from the seatback. The head restraint support member has a vertical extension portion extending generally parallel to the seatback plane, at least one horizontal travel arm generally perpendicular to the seatback plane, and a horizontal base arm. A head restraint inner structure engages the at least one horizontal travel arm and is movable linearly to a plurality of positions along the at least one horizontal travel arm. An active head restraint element is mounted to the head restraint inner structure and the horizontal base arm and is movable between a stowed position and a deployed position. The active head restraint element moves the head restraint inner structure to a head restraint forward position in response to moving into the deployed position. The active head restraint restraint element is biased towards the deployed position. A trigger element retains the active head restraint element in the stowed position and releases the active head restraint element during vehicle impact.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
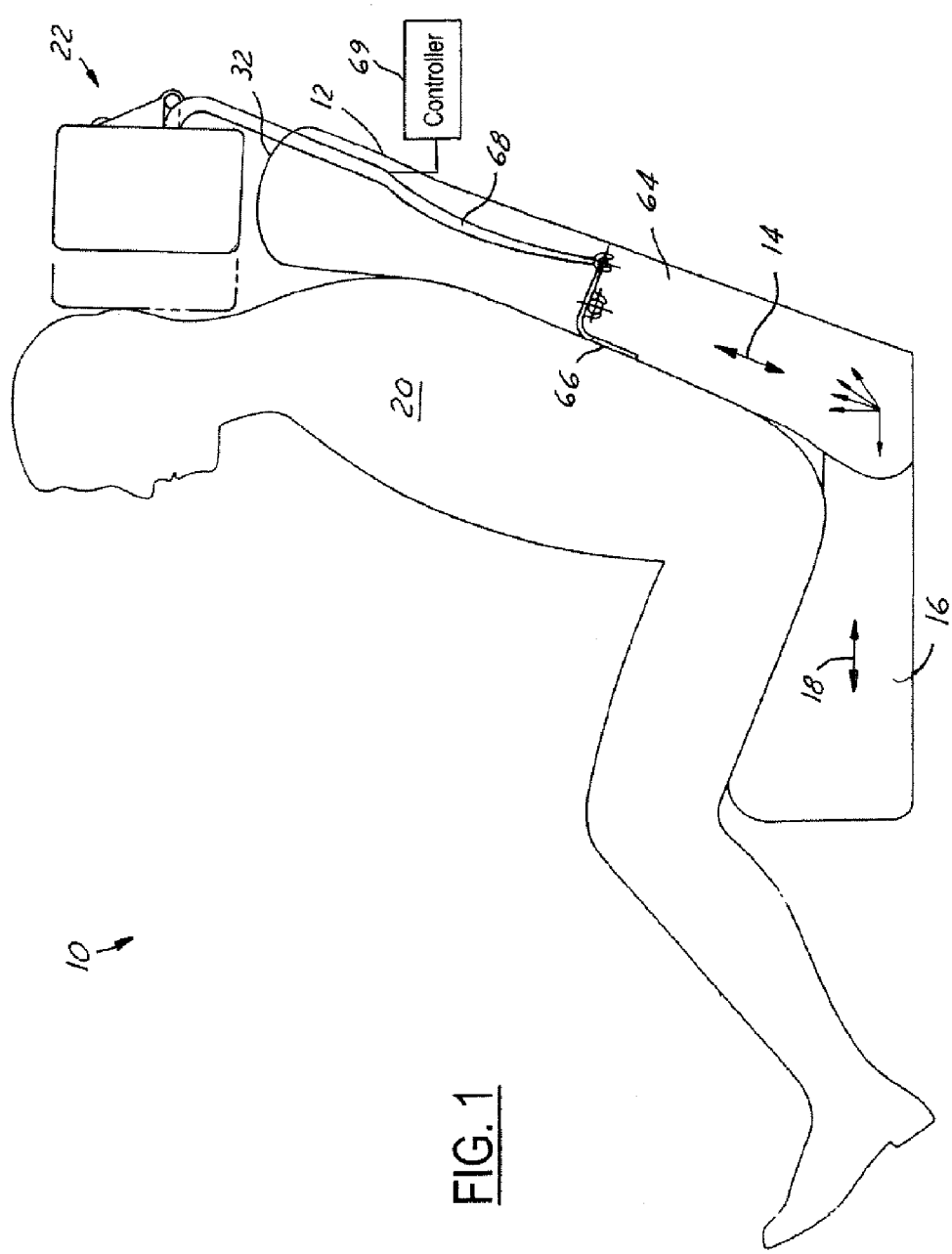
FIG. 1 is an illustration of an automotive seat assembly in accordance with the present invention.

Referring now to FIG. 1, which is an illustration of an automotive seat assembly 10 in accordance with the present invention. The automotive seat assembly 10 illustrated is intended to encompass a wide variety of seating configurations for both front and read automotive seats. The seat assembly 10 includes a seatback 12 defining a seatback plane 14 as well as a seatbase 16 defining a seatbase plane 18 as is well understood in the art. The seat assembly 10 is configured for the presence of an occupant 20. A head restraint assembly 22 is intended for use in conjunction with the seatback 12 for further passenger 20 comfort and safety. The present invention provides a unique and beneficial head restraint assembly 22 to provide an increase in the comfort and safety of the automotive seat assembly 10.

Modern seat design requirements often require the integration of a seatback impact response device 24 within the seat assembly 10. The present invention utilizes this integration in its design of the head restraint assembly 22. The automotive head restraint assembly 22 includes a head restraint support member 24 mounted to and extending vertically from the seatback 12. The head restraint support member 24 may be manufactured in a variety of fashions. However one particular embodiment contemplates a novel two-piece tubular support member 24 wherein the two pieces can be manufactured using simple machining techniques and joined with a weld 26 to form a single head restraint support member 24. The head restraint support member 24 includes a vertical extension portion 28 commonly comprising two vertical extension arms 30 extending from the seatback upper surface 32 generally parallel to the seatback plane 14. The head restraint support member 24 further includes at least one horizontal travel arm 34 orientated generally perpendicular to the seatback plane 14 and generally perpendicular, therefore, to the vertical extension portion 28. The term generally perpendicular is intended to embody the fact that the horizontal travel arm 34 provide a generally fore/aft orientation within the vehicle. The present invention preferably utilizes two horizontal travel arms 34 formed using tubular elements. A horizontal base arm 36 is positioned between the two horizontal travel arms 34. The advantage of this configuration is that it allows the head restraint support member 24 to be formed by simple bending of a tubular element.

Figure 3:
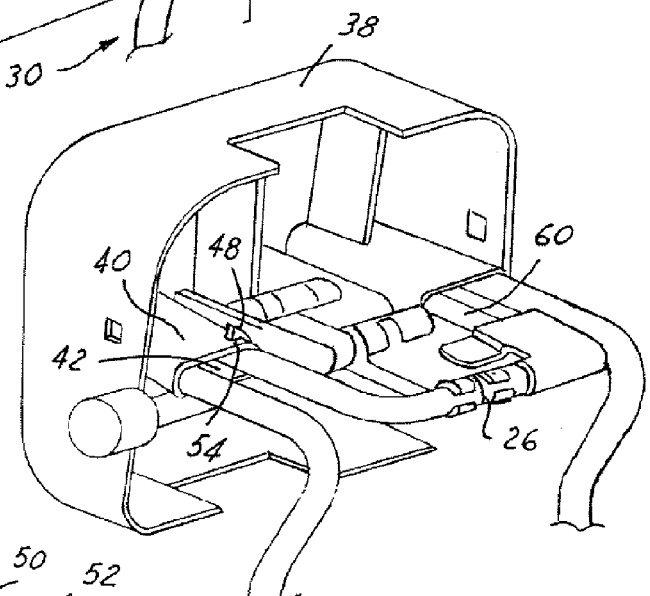
FIG. 3 is a detailed illustration of the head restraint assembly for use in the automotive seat assembly illustrated in FIG. 1, the head restraint assembly illustrated in the active head restraint element deployed position.

A head restraint inner structure 38 engages the horizontal travel arm(s) 34 such that it is movable along these travel arms 34 linearly through a plurality of position. This gives the head restraint inner structure 38 fore/aft adjustment abilities within the vehicle while retaining its orientation. Although this may be accomplished in a variety of fashions, one embodiment contemplates the use of one or more travel channels 40 formed through the head restraint inner structure 38 (See FIG. 3). The travel arms 34 are positioned within the travel channels 40 such that the head restraint inner structure 38 is constrained into linear travel along the horizontal travel arms 34. This configuration helps prevent jamming during movement and insures proper alignment. It is contemplated that the head restraint inner structure 38 be formed from cast polymer although variety of materials and manufacturing techniques are contemplated. In addition, as described above, the travel channels 40 either alone or in combination with stop features 42 may be used to limit motion of the head restraint inner structure.

It is desirable for the head restraint inner structure 38 to not only be movable to a variety of positions along the travel arms 34, but to be secured in each of these plurality of positions as well. To this end, the present invention includes a plurality of engagement notches 44 formed in the at least one travel arm 34. A locking arm 46 is mounted to the head restraint inner structure 38 and includes a locking blade 48 designed to engage one of the plurality of engagement notches 44 when in a locking arm engagement position 50. The locking arm is 46 is additionally movable into a locking arm disengagement position 52 wherein the locking blade 48 moves out of contact with the engagement notches 44 and the head restraint inner structure 38 is free to move along the horizontal travel arm 34. The locking arm 46 is preferably biased towards the locking arm engagement position 50. A channel guide 54 formed in the head restraint inner structure 38 can act as a guide for the locking blade 48 in addition to preventing rotational torque from being transferred to the locking arm 46. In at least one embodiment, the plurality of engagement notches 42 are unidirectional wherein they only engage in one direction. By way of example, they may be unidirectional such that the head restraint inner structure 38 may be moved forward even when the locking arm 46 is in the locking arm engagement position 50.

Figure 2:
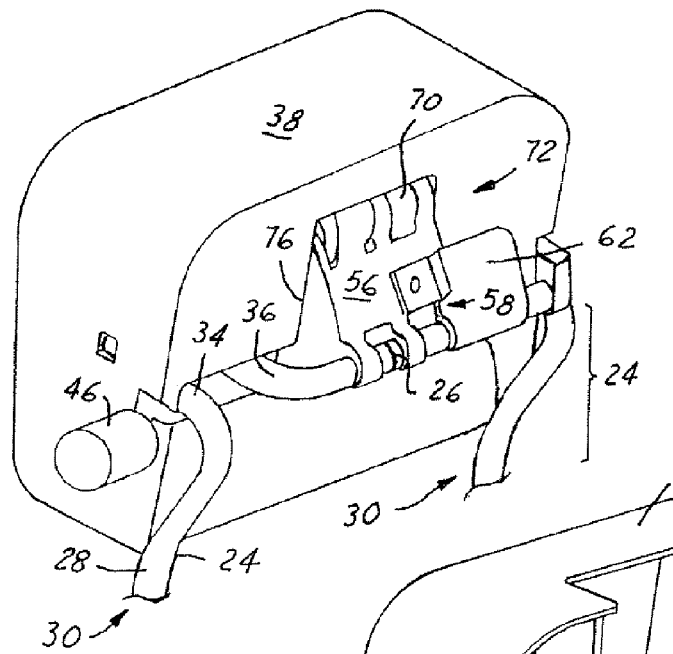
FIG. 2 is a detailed illustration of the head restraint assembly for use in the automotive seat assembly illustrated in FIG. 1, the head restraint assembly illustrated in the active head restraint element stowed position.
Figure 4:
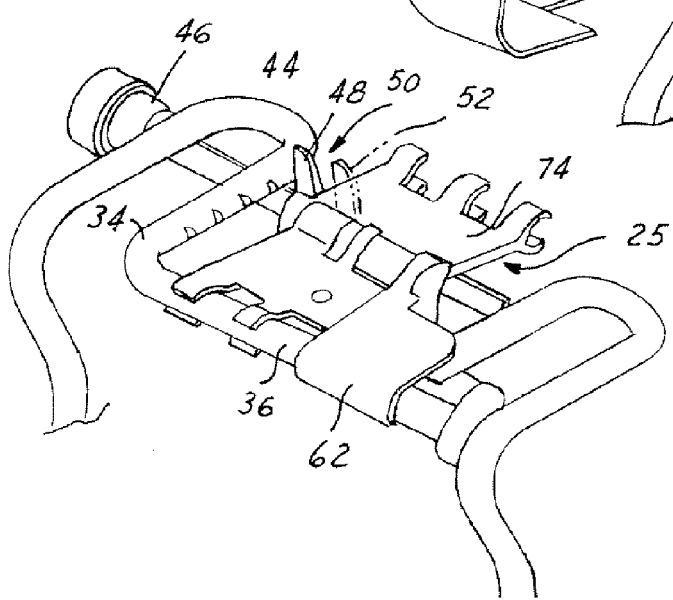
FIG. 4 is a detailed illustration of the active head restraint element illustrated in FIGS. 1–3.
Figure 5:
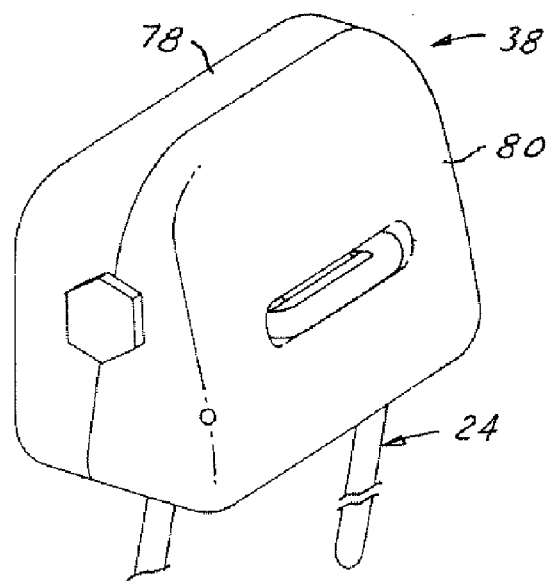
FIG. 5 is an illustration of a head restraint assembly for use in the automotive seat assembly illustrated in FIG. 1.
Figure 6:
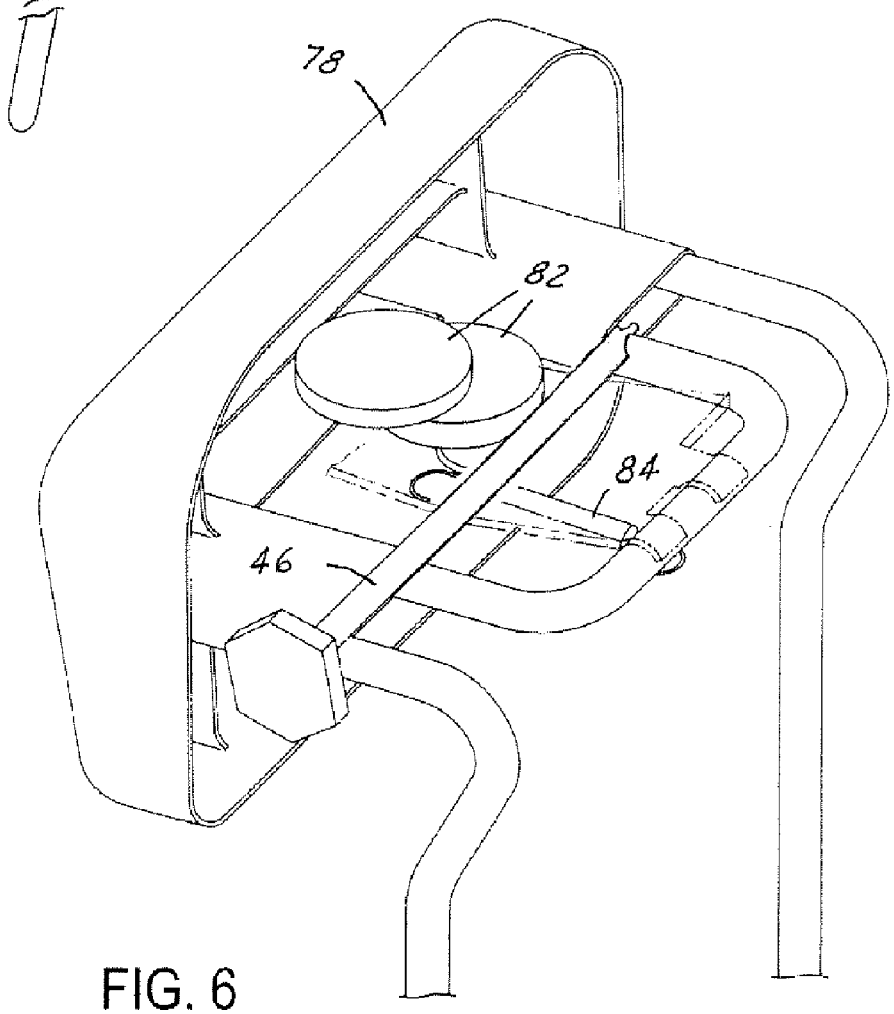
FIG. 6 is a detailed illustration of a portion of the head restraint assembly illustrated in FIG. 5, the detail illustrating the rear head restraint inner structure removed.
Figure 7:
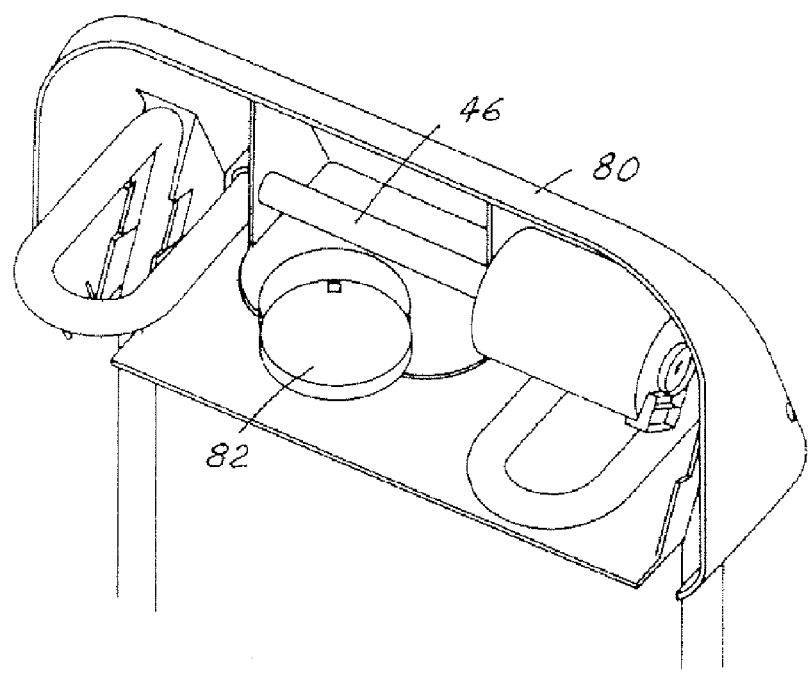
FIG. 7 is a detailed illustration of a portion of the head restraint assembly illustrated in FIG. 6, the detail illustrating the forward head restraint inner structure removed.

The present invention further includes an active restraint element 56 mounted in communication with both the head restraint inner structure 38 and the horizontal base arm 36. The active restraint element 56 is movable between a stowed position 58 (see FIG. 2) and a deployed position 60 (see FIGS. 3 and 4). The active restraint element 56 moves the head restraint inner structure 38 forward into a head restraint forward position 60 during vehicle impact to engage the passenger's head, which in turn reduces whiplash and related stressors. Although this may be accomplished in variety of fashions, one embodiment contemplates that the active restraint element 56 is biased towards the deployed position 60. A trigger element 62 is utilized to retain the active head restraint element 56 in the stowed position 58 until the trigger element 62 is activated during vehicle impact. Again, although this may be accomplished in a variety of fashions, one embodiment contemplates the use of a motion translation element 64 positioned within the seatback 12. The motion translation element 64 includes a back intrusion portion 66 which senses the occupants 20 intrusion into the seatback 12 during vehicle impact. The motion translation element 64 rotates and thereby translates the intrusion into a linear force on a cable 68 or similar linkage attached to the trigger element 62. The linkage 68 may be positioned within the head restraint support member 24 when hollow tubing is used to form the head restraint support member 24. The use of unidirectional engagement notches 42 allows the active restraint element 56 to move the head restraint inner surface 38 even if the locking arm 46 is engaged. In alternate embodiments the linkage 68 may be directly connected to the motion translation element 64 and thereby effectuate the movement from stowed 58 to deployed 60 without the requirement of biasing or the use of a trigger element 62. In still another contemplated option, an impact sensor 69 could be used to trip the trigger 62 or move the motion translation element 64.

Although a wide variety of motion translation elements 64 are contemplated, one embodiment contemplates the use of a hinge element 70 movable between a hinge folded position 72 and a hinge unfolded position 74. The folded position 72 and unfolded position 74 are intended to correspond to the stowed 58 and deployed 60 positions respectively. The use of a hinge element 70 allows for a very low profile element when in the stowed/folded position 72. It is contemplated that a hinge storage compartment 76 formed into the head restraint inner structure 38 works in combination with the hinge style element 70 to maximize the range of motions of the head restraint.

Figure 8:
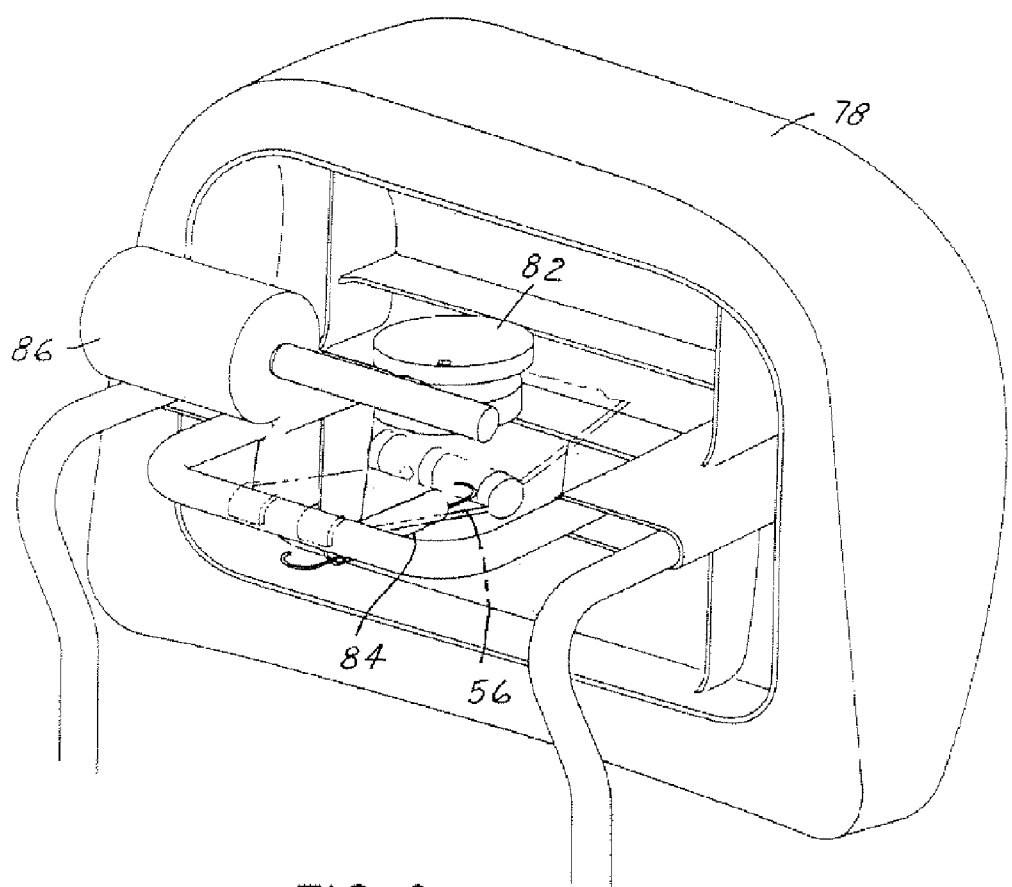
FIG. 8 is an alternate embodiment of the detailed illustration shown in FIG. 6, the detail illustrating the use of a motor assembly.

In an alternate embodiment illustrated in FIGS. 5 through 8, the head restraint inner structure 38 may be comprised of a forward head restraint inner structure 78 and a rear head restraint inner structure 80. In this embodiment the locking arm 46 is mounted to the head restraint support member 24. This may be accomplished in a variety of fashions such as mounting the locking arm 46 to the rear head restraint inner structure 80 which in turn is mounted to the head restraint support member 24. A cam assembly 82 is positioned between the locking arm 46 and the forward head restraint inner structure 78 and is in communication with both the arm 46 and the structure 78 such that rotation of the locking arm 46 rotates the cam assembly 82 and forces the forward head restraint inner structure 78 forward. A head restraint support structure biasing spring 84 can be utilized to bias the head restraint inners structure 38 against the cam assembly 82. This is beneficial as the cam assembly 82 provides forward control of the head restraint inner structure 38 without a rigid physical connection. Therefore, the cam assembly 82 does not interfere with active forward motion of the forward head restraint inner structure 78 effectuated by the active restraint element 56. As shown in FIG. 8, a motor assembly 86 may be mounted to the rear head restraint inner structure 80 and control rotation of the locking arm 46. This can be utilized to allow electronic control of the forward head restraint inner structure 78 positioning without interfering with active restraint element 56 actuation.

While particular embodiments of the invention have been shown and described, numerous variations and alternative embodiments will occur to those skilled in the art. Accordingly, it is intended that the invention be limited only in terms of the appended claims.

What is claimed is:

1. An automotive head restraint assembly for use in an automotive seat assembly having a seatbase defining a seatbase plane and a seatback defining a seatback plane, said automotive head restraint assembly comprising:
    a head restraint support member having at least one horizontal travel arm generally perpendicular to the seatback plane and a horizontal base arm;
    a head restraint inner structure engaging said at least one horizontal travel arm, said head restraint inner structure adjustable linearly to a plurality of positions along said at least one horizontal travel arm; and
    an active head restraint element mounted to said head restraint inner structure and said horizontal base arm, said active head restraint element movable between a stowed position and a deployed position, said active head restraint element moving said head restraint inner structure to a head restraint forward position in response to said active head restraint element moving into said deployed position, said active head restraint element deployed towards said deployed position during vehicle impact.

2. An automotive head restraint assembly as described in claim 1, wherein said active head restraint element is biased towards said deployed position and said active head restraint element further comprises:
    a trigger element retaining said active head restraint element in said stowed position, said trigger element releasing said active head restraint element during vehicle impact.

3. An automotive head restraint assembly as described in claim 2, further comprising:
    a motion translation element pivotably including a back translation portion mounted within the seatback, said motion translation element in communication with said trigger element such that said trigger element releases said active head restraint in response to said back translation portion moving into a back intrusion position.

4. An automotive head restraint assembly as described in claim 1, further comprising:
    a motion translation element including a back translation portion mounted within the seatback, said motion translation element in communication with said active head restraint element such that as said back translation portion moves into a back intrusion position said active head restraint element is moved into said deployed position.

5. An automotive head restraint assembly as described in claim 1, further comprising:
    a plurality of unidirectional engagement notches formed on said at least one horizontal travel arm; and
    a locking arm mounted to said head restraint inner structure, said locking arm biased to engage said plurality of uni-directional engagement notches, said locking arm movable between a locking arm engagement position and a locking arm disengagement position, said locking arm disengagement position allowing said head restraint inner structure to be movable linearly to a plurality of positions along said at least one horizontal travel arm, said uni-directional engagement notches allowing said active head restraint element to move said head restraint inner structure to said head restraint forward position while said locking arm is in said locking arm engagement position.

6. An automotive head restraint assembly for use in an automotive seat assembly having a seatbase defining a seatbase plane and a seatback defining a seatback plane, said automotive head restraint assembly comprising:
    a head restraint support member having at least one horizontal travel arm generally perpendicular to the seatback plane and a horizontal base arm;
    a head restraint inner structure engaging said at least one horizontal travel arm, said head restraint inner structure movable linearly to a plurality of positions along said at least one horizontal travel arm; and
    an active head restraint element mounted to said head restraint inner structure and said horizontal base arm, said active head restraint element movable between a stowed position and a deployed position, said active head restraint element moving said head restraint inner structure to a head restraint forward position in response to said active head restraint element moving into said deployed position, said active head restraint element deployed towards said deployed position during vehicle impact;
    a locking arm mounted in rigid positional communication with said head restraint support member; and
    a cam assembly positioned between and in communication with said locking arm and said head restraint inner structure, said cam assembly forcing said head restraint inner structure forward in response to rotation of said locking arm, said head restraint inner structure biased rearward against said cam assembly.

7. An automotive head restraint assembly as described in claim 6, wherein as said active head restraint element moves into said deployed position said cam assembly is moved out of communication with said head restraint inner structure such that said cam assembly does not interfere with said active head restraint element.

8. An automotive head restraint assembly as described in claim 1, wherein said active head restraint element comprises a hinge element, said hinge element movable between a hinge folded position and a hinge unfolded position, said hinge folded position corresponding to said stowed position.

9. An automotive head restraint assembly for use in an automotive seat assembly having a seatbase defining a seatbase plane and a seatback defining a seatback plane, said automotive head restraint assembly comprising:
    a head restraint support member having at least one horizontal travel arm generally perpendicular to the seatback plane and a horizontal base arm;
    a head restraint inner structure engaging said at least one horizontal travel arm, said head restraint inner structure movable linearly to a plurality of positions along said at least one horizontal travel arm;

an active head restraint element mounted to said head restraint inner structure and said horizontal base arm, said active head restraint element movable between a stowed position and a deployed position, said active head restraint element moving said head restraint inner structure to a head restraint forward position in response to said active head restraint element moving into said deployed position, said active head restraint element deployed towards said deployed position during vehicle impact, said active head restraint element comprising a hinge element, said hinge element movable between a hinge folded position and a hinge unfolded position, said hinge folded position corresponding to said stowed position; and a hinge storage compartment formed in said head restraint inner structure, said active head restraint element stored in said hinge storage compartment when in a head restraint rearward position.

10. An automotive seat assembly comprising:

a seatbase defining a seatbase plane;

a seatback defining a seatback plane;

a head restraint support member configured to extend vertically from the seatback, said head restraint support member having a vertical extension portion extending generally parallel to the seatback plane, at least one horizontal travel arm generally perpendicular to the seatback plane, and a horizontal base arm;

a one piece head restraint inner structure engaging said at least one horizontal travel arm, said head restraint inner structure movable linearly to a plurality of positions along said at least one horizontal travel arm; and an active head restraint element mounted to said head restraint inner structure and said horizontal base arm, said active head restraint element movable between a stowed position and a deployed position, said active head restraint element moving said head restraint inner structure to a head restraint forward position in response to said active head restraint element moving into said deployed position, said active head restraint element biased towards said deployed position; and a trigger element retaining said active head restraint element in said stowed position, said trigger element releasing said active head restraint element during vehicle impact.

11. An automotive seat assembly comprising:

a seatbase defining a seatbase plane;

a seatback defining a seatback plane;

a head restraint support member configured to extend vertically from the seatback, said head restraint support member having a vertical extension portion extending generally parallel to the seatback plane, at least one horizontal travel arm generally perpendicular to the seatback plane, and a horizontal base arm;

a head restraint inner structure engaging said at least one horizontal travel arm, said head restraint inner structure movable linearly to a plurality of positions along said at least one horizontal travel arm; and an active head restraint element mounted to said head restraint inner structure and said horizontal base arm, said active head restraint element movable between a stowed position and a deployed position, said active head restraint element moving said head restraint inner structure to a head restraint forward position in response to said active head restraint element moving into said deployed position, said active head restraint element biased towards said deployed position; and a trigger element retaining said active head restraint element in said stowed position, said trigger element releasing said active head restraint element during vehicle impact, said head restraint support member comprising a tubular support member, said at least one horizontal travel arm comprising a pair of horizontal travel arms, said horizontal base arm positioned between said pair of horizontal travel arms.

12. An automotive seat assembly as described in claim 10, further comprising:

a plurality of engagement notches formed on said at least one horizontal travel arm; and an locking arm mounted to said head restraint inner structure, said locking arm biased to engage said plurality of engagement notches, said locking arm movable between a locking arm engagement position and a locking arm disengagement position, said locking arm disengagement position allowing said head restraint inner structure to be movable linearly to a plurality of positions along said at least one horizontal travel arm.

13. An automotive seat assembly as described in claim 12, wherein said plurality of engagement notches comprises:

a plurality of unidirectional engagement notches, said unidirectional engagement notches allowing said head restraint inner structure to be movable relative to said at least one horizontal travel arm in only a forward direction when said locking arm is in said locking arm engagement position.

14. An automotive head restraint assembly as described in claim 10, further comprising:

a travel channel formed through said head restraint inner structure, said at least one horizontal travel arm positioned within said travel channel, said travel channel engaging said at least one horizontal travel arm such that said head restraint inner structure is constrained into linear travel along said at least one horizontal travel arm.

15. An automotive seat assembly as described in claim 10, further comprising:

a motion translation element including a back translation portion mounted within the seatback, said motion translation element in communication with said active head restraint element such that as said back translation portion moves into a back intrusion position said active head restraint element is moved into said deployed position.

16. An automotive seat assembly as described in claim 10, wherein said active head restraint element comprises a hinge element, said hinge element movable between a hinge folded position and a hinge unfolded position, said hinge folded position corresponding to said stowed position.

17. A method of providing linear fore/aft notion to an automotive head restraint assembly comprising:

rotating a motion translation element positioned within a seatback from a back engagement stable position to a back intrusion position;

activating an active head restraint element in response to said motion translation element moving into said back intrusion position, said active head restraint element mounted to a head restraint inner structure and a horizontal base arm of a head restraint support member;

moving said active head restraint element into a deployed position in response to activating said active head restraint element, said active head restraint element moving said head restraint inner structure linearly forward along a horizontal travel arm formed as a portion of said head restraint support member, said head restraint inner structure moving to a head restraint forward position in response to said active head restraint moving into said deployed position, said head restraint inners structure including a travel channel engaging said horizontal travel arm such that said head restraint inner structure is adjustable linearly to a plurality of positions along said at least one horizontal travel arm.

18. A method of providing linear fore/aft motion to an automotive head restraint assembly as described in claim 17, further comprising:

biasing said active head restraint towards said deployed position;

locking said active head restraint in a stowed position; and releasing said active head restraint during activation such that said active head restraint moves into said deployed position.

19. A method of providing linear fore/aft motion to an automotive head restraint assembly as described in claim 17, further comprising:

biasing said active head restraint towards said deployed position;

locking said head restraint inner structure in one of said plurality of positions utilizing a locking arm mounted to said head restraint inner structure, said locking arm engaging one of a plurality of engagement notches formed on said horizontal travel arm; and releasing said locking arm in order to activate said active head restraint element.

20. A method of providing linear fore/aft motion to an automotive head restraint assembly as described in claim 17, further comprising:

locking said head restraint inner structure from rearward motion in one of said plurality of positions utilizing a locking arm mounted to said head restraint inner structure, said locking arm engaging one of a plurality of engagement notches formed on said horizontal travel arm, said plurality of engagement notches comprising unidirectional notches allowing said head restraint inners structure to be moved forward into said head restraint forward position while said locking arm is in an engagement position.

* * * * *